(12) United States Patent
Campbell et al.

(10) Patent No.: US 10,900,908 B2
(45) Date of Patent: Jan. 26, 2021

(54) CHEMILUMINESCENCE FOR TAMPER EVENT DETECTION

(71) Applicant: International Business Machines Corporation, Armonk, NY (US)

(72) Inventors: Eric J. Campbell, Rochester, MN (US); Sarah K. Czaplewski, Rochester, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 15/603,933

(22) Filed: May 24, 2017

(65) Prior Publication Data

US 2018/0340850 A1  Nov. 29, 2018

(51) Int. Cl.
*G01N 21/76* (2006.01)
*C09K 11/07* (2006.01)
(Continued)

(52) U.S. Cl.
CPC ............ *G01N 21/76* (2013.01); *B01J 39/20* (2013.01); *B01J 41/14* (2013.01); *C09K 11/025* (2013.01);
(Continued)

(58) Field of Classification Search
CPC ...... G01N 21/76; C09K 11/07; C09K 11/025; C09K 2211/1007; C09K 2211/1014;
(Continued)

(56) References Cited

U.S. PATENT DOCUMENTS 3,481,790 A   12/1969  Duddy
3,653,372 A   4/1972   Douglas
(Continued)

FOREIGN PATENT DOCUMENTS

CA        918331         1/1973
CN        103740978 A    4/2014
(Continued)

OTHER PUBLICATIONS

U.S. Appl. No. 15/603,686, to Eric J. Campbell et al., entitled, *Light Generating Microcapsules for Self-Healing Polymer Applications*, assigned to International Business Machines Corporation, 34 pages, filed May 24, 2017.
(Continued)

*Primary Examiner* — Nimeshkumar D Patel
*Assistant Examiner* — Tania Courson
(74) *Attorney, Agent, or Firm* — Robert J. Shatto

(57) ABSTRACT

A secured device includes an electronic component and a protective cover surrounding the electronic component. The secured device also includes one or more chemiluminescent reactant layers and a light sensor that is electrically connected to the electronic component. The one or more chemiluminescent reactant layers are disposed between the protective cover and the electronic component and include multiple reactants that undergo a chemiluminescent reaction. The light sensor is configured to trigger one or more tamper response operations responsive to detection of a photon generated by the chemiluminescent reaction.

20 Claims, 7 Drawing Sheets

(51) Int. Cl.
*C09K 11/02* (2006.01)
*B01J 39/20* (2006.01)
*B01J 41/14* (2006.01)
*B82Y 30/00* (2011.01)
*B82Y 40/00* (2011.01)
*H01F 1/00* (2006.01)
*B82Y 15/00* (2011.01)

(52) U.S. Cl.
CPC ............... *C09K 11/07* (2013.01); *B82Y 15/00* (2013.01); *B82Y 30/00* (2013.01); *B82Y 40/00* (2013.01); *C09K 2211/1007* (2013.01); *C09K 2211/1014* (2013.01); *H01F 1/0063* (2013.01)

(58) Field of Classification Search
CPC .......... B01J 39/20; B01J 41/14; B82Y 40/00; B82Y 15/00; B82Y 30/00; H01F 1/0063
See application file for complete search history.

(56) References Cited

U.S. PATENT DOCUMENTS

| | | | |
|---|---|---|---|
| 3,656,372 A | 4/1972 | Chana | |
| 3,689,391 A * | 9/1972 | Ullman | B01J 19/08 204/157.91 |
| 4,095,583 A | 6/1978 | Petersen et al. | |
| 4,233,402 A * | 11/1980 | Maggio | G01N 33/581 435/5 |
| 4,273,671 A * | 6/1981 | Allinikov | G01N 21/91 252/301.19 |
| 4,278,837 A | 7/1981 | Best et al. | |
| 4,598,274 A | 7/1986 | Holmes | |
| 4,635,166 A * | 1/1987 | Cameron | F21K 2/06 362/34 |
| 4,772,530 A | 9/1988 | Gottschalk et al. | |
| 4,811,288 A | 3/1989 | Kleijne et al. | |
| 4,814,949 A * | 3/1989 | Elliott | F21K 2/06 362/34 |
| 4,816,367 A | 3/1989 | Sakojiri et al. | |
| 5,169,707 A | 12/1992 | Faykish et al. | |
| 5,319,475 A | 6/1994 | Kay et al. | |
| 5,325,721 A * | 7/1994 | Pendergrass, Jr. | G01K 11/06 116/216 |
| 5,406,630 A * | 4/1995 | Piosenka | G01K 7/01 257/E23.08 |
| 5,508,893 A | 4/1996 | Nowak et al. | |
| 5,904,795 A | 5/1999 | Murakami et al. | |
| 5,904,796 A | 5/1999 | Freuler et al. | |
| 5,945,995 A | 8/1999 | Higuchi et al. | |
| 5,984,995 A | 11/1999 | White | |
| 6,114,413 A | 9/2000 | Kang et al. | |
| 6,217,213 B1 | 4/2001 | Curry et al. | |
| 6,235,148 B1 * | 5/2001 | Courson, Jr. | C09J 5/00 156/272.2 |
| 6,530,527 B1 | 3/2003 | Ahlers et al. | |
| 6,758,572 B2 * | 7/2004 | Ladyjensky | F21K 2/06 362/34 |
| 6,776,495 B2 * | 8/2004 | Nomiyama | F21K 2/06 362/231 |
| 6,833,191 B2 | 12/2004 | Bayless | |
| 6,876,143 B2 | 4/2005 | Daniels | |
| 6,947,285 B2 | 9/2005 | Chen et al. | |
| 7,005,733 B2 * | 2/2006 | Kommerling | G06F 21/86 257/679 |
| 7,065,656 B2 | 6/2006 | Schwenck et al. | |
| 7,223,964 B2 | 5/2007 | Wiese et al. | |
| 7,247,791 B2 * | 7/2007 | Kulpa | G06F 21/87 174/17 R |
| 7,248,359 B2 * | 7/2007 | Boege | G01J 3/10 356/317 |
| 7,274,791 B2 | 9/2007 | van Enk | |
| 7,290,549 B2 | 11/2007 | Banerjee et al. | |
| 7,296,299 B2 | 11/2007 | Schwenck et al. | |
| 7,362,248 B2 | 4/2008 | McClure et al. | |
| 7,385,491 B2 | 6/2008 | Doi | |
| 7,436,316 B2 * | 10/2008 | Fleischman | G06F 21/86 250/224 |
| 7,443,176 B2 | 10/2008 | McClure et al. | |
| 7,488,954 B2 | 2/2009 | Ross et al. | |
| 7,518,507 B2 * | 4/2009 | Dalzell | G08B 13/1481 340/540 |
| 7,540,621 B2 * | 6/2009 | Goychrach | C09K 11/07 362/34 |
| 7,573,301 B2 | 8/2009 | Walmsley | |
| 7,666,813 B2 | 2/2010 | Hoefer et al. | |
| 7,806,072 B2 | 10/2010 | Hamilton, II et al. | |
| 7,816,785 B2 | 10/2010 | Iruvanti et al. | |
| 7,830,021 B1 | 11/2010 | Wilcoxon et al. | |
| 7,834,442 B2 | 11/2010 | Furman et al. | |
| 7,886,813 B2 | 2/2011 | Hua et al. | |
| 7,889,442 B2 | 2/2011 | Suzuki et al. | |
| 7,952,478 B2 | 5/2011 | Bartley et al. | |
| 8,137,597 B1 * | 3/2012 | Brott | F21K 2/06 252/700 |
| 8,174,112 B1 | 5/2012 | Karp et al. | |
| 8,198,641 B2 * | 6/2012 | Zachariasse | G06F 21/77 257/81 |
| 8,288,857 B2 * | 10/2012 | Das | H01L 23/42 257/687 |
| 8,310,147 B2 | 11/2012 | Seo et al. | |
| 8,502,396 B2 | 8/2013 | Buer et al. | |
| 8,522,049 B1 | 8/2013 | Ahmadi | |
| 8,581,209 B2 | 11/2013 | Oxley et al. | |
| 8,623,418 B2 | 1/2014 | Liang et al. | |
| 8,647,579 B2 * | 2/2014 | La Grone | G01N 21/766 422/82.05 |
| 8,659,908 B2 | 2/2014 | Adams et al. | |
| 8,741,084 B2 | 6/2014 | Kisch et al. | |
| 8,741,804 B2 | 6/2014 | Boday et al. | |
| 8,824,040 B1 | 9/2014 | Buchheit et al. | |
| 8,865,285 B2 | 10/2014 | Dagher et al. | |
| 8,896,100 B2 | 11/2014 | Kishino et al. | |
| 8,896,110 B2 | 11/2014 | Hu et al. | |
| 9,040,252 B2 | 5/2015 | Della Ciana et al. | |
| 9,075,018 B2 | 7/2015 | Geddes et al. | |
| 9,217,736 B2 | 12/2015 | Ribi | |
| 9,245,202 B2 * | 1/2016 | Boday | G01N 21/6447 |
| 9,263,605 B1 * | 2/2016 | Morgan | H01L 31/0547 |
| 9,307,692 B2 * | 4/2016 | Boday | A01N 25/28 |
| 9,856,404 B2 | 1/2018 | Campbell et al. | |
| 9,858,780 B1 * | 1/2018 | Campbell | G06F 21/86 |
| 9,896,389 B2 * | 2/2018 | Campbell | C06B 45/32 |
| 10,040,993 B1 * | 8/2018 | Brott | B01J 13/185 |
| 10,215,648 B1 | 2/2019 | Pillars et al. | |
| 10,229,292 B2 * | 3/2019 | Campbell | G06F 21/86 |
| 10,318,462 B2 | 6/2019 | Bartley | |
| 10,331,911 B2 * | 6/2019 | Kuczynski | G06F 21/87 |
| 10,357,921 B2 * | 7/2019 | Campbell | C08F 2/48 |
| 10,392,452 B2 * | 8/2019 | Campbell | C08F 20/06 |
| 10,508,204 B2 * | 12/2019 | Odarczenko | C08G 59/188 |
| 10,513,735 B2 | 12/2019 | Swartz et al. | |
| 10,696,761 B2 * | 6/2020 | Campbell | C08F 20/18 |
| 10,696,899 B2 * | 6/2020 | Campbell | C01G 49/0018 |
| 2005/0068760 A1 | 3/2005 | Goychrach | |
| 2006/0079021 A1 | 4/2006 | Yang | |
| 2006/0228542 A1 | 10/2006 | Czubarow | |
| 2007/0054762 A1 | 3/2007 | Tocco | |
| 2007/0207284 A1 | 9/2007 | McClintic | |
| 2008/0038540 A1 | 2/2008 | Hirayama et al. | |
| 2008/0090942 A1 * | 4/2008 | Hovorka | C08K 5/0041 523/200 |
| 2008/0277596 A1 | 11/2008 | Oxley | |
| 2008/0286856 A1 | 11/2008 | Park et al. | |
| 2009/0036568 A1 | 2/2009 | Merle et al. | |
| 2009/0155571 A1 * | 6/2009 | Mustonen | B41M 5/165 428/327 |
| 2010/0006431 A1 | 1/2010 | Wallace et al. | |
| 2012/0007249 A1 | 1/2012 | Kuo et al. | |
| 2012/0077279 A1 | 3/2012 | Wiesner et al. | |
| 2013/0034739 A1 | 2/2013 | Boday et al. | |
| 2013/0179996 A1 * | 7/2013 | Boday | G06F 21/88 726/34 |

(56) References Cited

U.S. PATENT DOCUMENTS

| | | | |
|---|---|---|---|
| 2014/0011049 | A1 | 1/2014 | Stamm |
| 2014/0110049 | A1 | 4/2014 | Yuen et al. |
| 2014/0368992 | A1 | 12/2014 | Strader et al. |
| 2015/0038809 | A1* | 2/2015 | Etzkorn ............. A61B 5/14532 600/318 |
| 2015/0166822 | A1 | 6/2015 | Samsudin et al. |
| 2015/0246521 | A1 | 9/2015 | Fathi et al. |
| 2015/0364710 | A1 | 12/2015 | Chen et al. |
| 2016/0033497 | A1 | 2/2016 | Wang et al. |
| 2016/0053169 | A1 | 2/2016 | Kunath et al. |
| 2016/0067524 | A1 | 3/2016 | Bourke, Jr. |
| 2016/0289484 | A1 | 10/2016 | Lalgudi et al. |
| 2017/0015886 | A1 | 1/2017 | Braun et al. |
| 2017/0027197 | A1 | 2/2017 | Bourke, Jr. et al. |
| 2017/0029532 | A1 | 2/2017 | Pandya |
| 2017/0129825 | A1 | 5/2017 | Campbell et al. |
| 2017/0130102 | A1 | 5/2017 | Campbell et al. |
| 2017/0130993 | A1 | 5/2017 | Campbell et al. |
| 2017/0158886 | A1 | 6/2017 | Odarczenko |
| 2017/0279532 | A1* | 9/2017 | Bartley ............... G06F 13/4068 |
| 2018/0116060 | A1* | 4/2018 | Campbell ............ H05K 5/0208 |
| 2018/0158305 | A1 | 6/2018 | Noland et al. |
| 2018/0327659 | A1* | 11/2018 | Campbell .............. C09K 11/00 |
| 2018/0340032 | A1 | 11/2018 | Campbell et al. |
| 2018/0371122 | A1 | 12/2018 | Campbell et al. |
| 2018/0371123 | A1* | 12/2018 | Campbell ................. C09B 6/00 |
| 2019/0291357 | A1 | 9/2019 | Campbell et al. |
| 2019/0309105 | A1 | 10/2019 | Campbell et al. |

FOREIGN PATENT DOCUMENTS

| | | |
|---|---|---|
| CN | 103740997 A | 4/2014 |
| JP | 2000317578 A | 11/2000 |
| JP | 2001176924 A | 6/2001 |
| JP | 4073571 B2 | 2/2008 |
| WO | 9733922 A1 | 9/1997 |
| WO | WO-2009/029804 A2 | 3/2009 |
| WO | WO-2011/086018 A1 | 7/2011 |
| WO | WO-2013/041871 A2 | 3/2013 |
| WO | 2014204828 A2 | 12/2014 |
| WO | WO-2014/204828 A2 | 12/2014 |
| WO | WO-2016/186336 A1 | 11/2016 |

OTHER PUBLICATIONS

U.S. Appl. No. 15/631,165, to Eric J. Campbell et al., entitled, *Light Generating Microcapsules for Self-Healing Polymer Applications*, assigned to International Business Machines Corporation, 33 pages, filed Jun. 23, 2017.

U.S. Appl. No. 16/015,753, to Eric J. Campbell et al., entitled, *Light Generating Microcapsules for Photo-Curing*, assigned to International Business Machines Corporation, 33 pages, filed Jun. 22, 2018.

Appendix P; List of IBM Patent or Applications Treated as Related, Oct. 16, 2018, 2 pages.

Park et al., *Smart Microplates: Integrated Photodiodes for Detecting Bead-Based Chemiluminescent Reactions*, 5$^{th}$ IEEE Conference on Sensors, EXCO, (IEEE Sensors 2006), held Oct. 2006, Daegu, Korea, pp. 580-583, Institute of Electrical and Electronics Engineers (IEEE), DOI: 10.1109/ICSENS.2007.355534, USA.

Zhan et al., *Electrochemical Sensing in Microfluidic Systems Using Electrogenerated Chemiluminescence as a Photonic Reporter of Redox Reactions*, JACS Articles, vol. 124, No. 44, Oct. 2002, pp. 13265-13270, American Chemical Society, Washington, D.C.

Jorgensen et al., *A Biochemical Microdevice With an Integrated Chemiluminescence Detector*, Sensors and Actuators B: Chemical, vol. 90, Issue 1, Apr. 2003, pp. 15-21, Elsevier, Amsterdam, Netherlands.

Previte et al., *Microwave-Triggered Metal-Enhanced Chemiluminescence (MT-MEC): Application to Ultra-Fast and Ultra-Sensitive Clinical Assays*, Journal of Fluorescence, vol. 16, Issue 5, Sep. 2006, pp. 641-647, Springer Science+Business Media, Berlin, Germany.

Marzzacco, *The Effect of a Change in the Catalyst on the Enthalpy of Decomposition of Hydrogen Peroxide*, pp. 12-13, Chem 13 News, Nov. 2008, reprinted from pp. 16-17, May 2001, University of Waterloo, Waterloo, ON, Canada.

Masin, *The Chemistry of Hand Warmers*, 3 pages, chemistryislife.com (online), accessed Jun. 5, 2017, URL: www.chemistryislife.com/the-chemistry-_of-hand-warmer.

Unknown, *Flameless Chemical Heaters*, zenstoves.net (online), 4 pages, accessed Jun. 5, 2017, URL: http://zenstoves.net/Flameless.htm.

Unknown, *Flameless Ration Heater (FRH)*, MREInfo.com (online), 2014, 5 pages, accessed Jun. 5, 2017, URL: www.mreinfo.com/us/mre/frh.html.

Kawashita et al., *In vitro heat generation by ferrimagnetic maghemite microspheres for hyperthermic treatment of cancer under alternating magnetic field*, Journal of Materials Science: Materials in Medicine, vol. 19, Issue 5, pp. 1897-1903, May 2008, (Abstract Only, 2 pages), URL: www.ncbi.nlm.nih.gov/pubmed/17914614.

Unknown, *PTFE Coatings*, Specific Heat of Some Common Substances, engineeringtoolbox.com (online), 7 pages, accessed Jun. 5, 2017, URL: www.engineeringtoolbox.com/specific-heat-capacity-d_391.html.

Unknown, *Standard enthalpy change of formation (data table)*, Wikipedia.org (online), 13 pages, accessed Jun. 5, 2017, URL: en.wikipedia.org/wiki/Standard_enthalpy_change_of_formation_%28data_table%29.

Unknown, *Technical Overview: Microencapsulation*, microteklabs.com (online), 4 pages, accessed Jun. 5, 2017, URL: www.microteklabs.com/technical_overview.pdf.

Unknown, *Thermochemistry*, 7 pages, Olomouc—Hejčín Gymnasium (online), 7 pages, accessed Jun. 5, 2017, URL: http://smd.gytool.cz/downloads/thermochemistry_bar.pdf.

Delcea et al., *Multicompartmental Micro- and Nanocapsules: Hierarchy and Applications in Biosciences*, Macromolecular Bioscience, vol. 10, May 2010, pp. 465-474, Wiley-VCH Verlag GmbH & Co., Weinheim.

Lee, *Microencapsulated Heat Generating Material to Accelerate the Curing Process During Liquid Crystal Display Fabrication*, NineSigma, Inc. (online), 2014 (month unknown), 3 pages, accessed Jun. 5, 2017, URL: https://ninesights.ninesigma.com/rfps/-/rfp-portlet/rfpViewer/2690.

Brown et al., *In situ poly(urea-formaldehyde) microencapsulation of dicyclopentadiene*, Journal of Microencapsulation, Nov.-Dec. 2003, vol. 20, No. 6, pp. 719-730, Taylor & Francis Ltd (online, www.tandf.co.uk/journals), DOI: 10.1080/0265204031000154160.

Keller et al., *Mechanical Properties of Microcapsules Used in a Self-Healing Polymer*, Experimental Mechanics, vol. 46, Nov. 2006, pp. 725-733, Society for Experimental Mechanics, Bethel, CT.

Hu et al., *Controlled Rupture of Magnetic Polyelectrolyte Microcapsules for Drug Delivery*, Langmuir, vol. 24, Sep. 2008, pp. 11811-11818, American Chemical Society, USA.

Unknown, *Materials for Sealing Liquid Crystal*, Three Bond Technical News, vol. 43, May 1994, pp. 1-8, Three Bond Europe, UK.

Unknown, *Advanced Technologies for LCD Assembly*, DowCorning.com (online), 2014 (month unknown), 4 pages, accessed Jun. 5, 2017, URL: www.dowcorning.com/content/publishedlit/11-3437_Advanced_Technologies_LCD_Assembly.pdf?wt.svl=ELEC_LHH.

Unknown, *LOCTITE ECCOBOND DS 6601*, Henkel.com (online), Mar. 2013, 2 pages, URL: https://tds.us.henkel.com/NA/UT/HNAUTTDS.nsf/web/C0DD8377AB27D63985257B41005DC4A1/$File/LOCTITE%20ECCOBOND%20DS%206601-EN.pdf.

Stober et al., *Controlled Growth of Monodisperse Silica Spheres in the Micron Size Range*, Journal of Colloid and Interface Science, vol. 26, Jan. 1968, pp. 62-69, Elsevier Inc., Amsterdam.

AUS920170084US1, Appendix P; List of IBM Patents or Applications Treated as Related, Mar. 20, 2018, 2 pages.

Appendix P; List of IBM Patent or Applications Treated as Related, Jul. 25, 2017, 2 pages.

(56) References Cited

OTHER PUBLICATIONS

U.S. Appl. No. 15/590,676, to Eric J. Campbell et al., entitled, *Light Emitting Shell in Shell Microcapsules*, filed May 9, 2017, assigned to International Business Machines Corporation.

Yamaura et al., *Preparation and characterization of (3-aminopropyl) triethoxysilane-coated magnetite nanoparticles*, Journal of Magnetism and Magnetic Materials, vol. 279, Issues 2-3, Aug. 2004, pp. 210-217, ScienceDirect.com (online), Elsevier B.V., Amsterdam.

Kreft et al., *Shell-in-Shell Microcapsules: A Novel Tool for Integrated, Spatially Confined Enzymatic Reactions*, Angewandte Chemie, Int. Ed., Jul. 2007 (online Jun. 2007), vol. 46, Issue 29, pp. 5605-5608, Wiley-VCH Verlag GmbH & Co., KGaA, Weinheim, DOI: 10.1002/anie.200701173.

Xiong et al., *Towards Theranostic Multicompartment Microcapsules: in-situ Diagnostics and Laser-induced Treatment*, Theranostics, vol. 3, Issue 3, Feb. 2013, pp. 141-151, Ivyspring International, Sydney, Australia.

Parakhonskiy, *Colloidal micro- and nano-particles as templates for polyelectrolyte multilayer capsules*, Advances in Colloid and Interface Science, May 2014, vol. 207, pp. 253-264, ScienceDirect.com (online), Elsevier B.V., Amsterdam.

U.S. Appl. No. 15/299,257, to Eric J. Campbell et al., entitled, *Tamper Resistant Electronic Devices*, assigned to International Business Machines Corporation, 30 pages.

U.S. Appl. No. 15/080,120, to Gerald K. Bartley et al., entitled, *Secure Crypto Module Including Optical Glass Security Layer*, assigned to International Business Machines Corporation, 41 pages.

Caruso et al. "Robust, Double-Walled Microcapsules for Self-Healing Polymeric Materials," ACS Applied Materials & Interfaces, 2010, vol. 2, No. 4, pp. 1195-1199.

Engineering ToolBox, (2003). Specific Heat of some common Substances. [online] Available at: https://www.engineeringtoolbox.com/specific-heat-capacity-d_391.html [Accessed Jan. 9, 2020].

List of IBM Patents or Patent Applications Treated as Related, Jan. 16, 2020, 2 pages.

\* cited by examiner

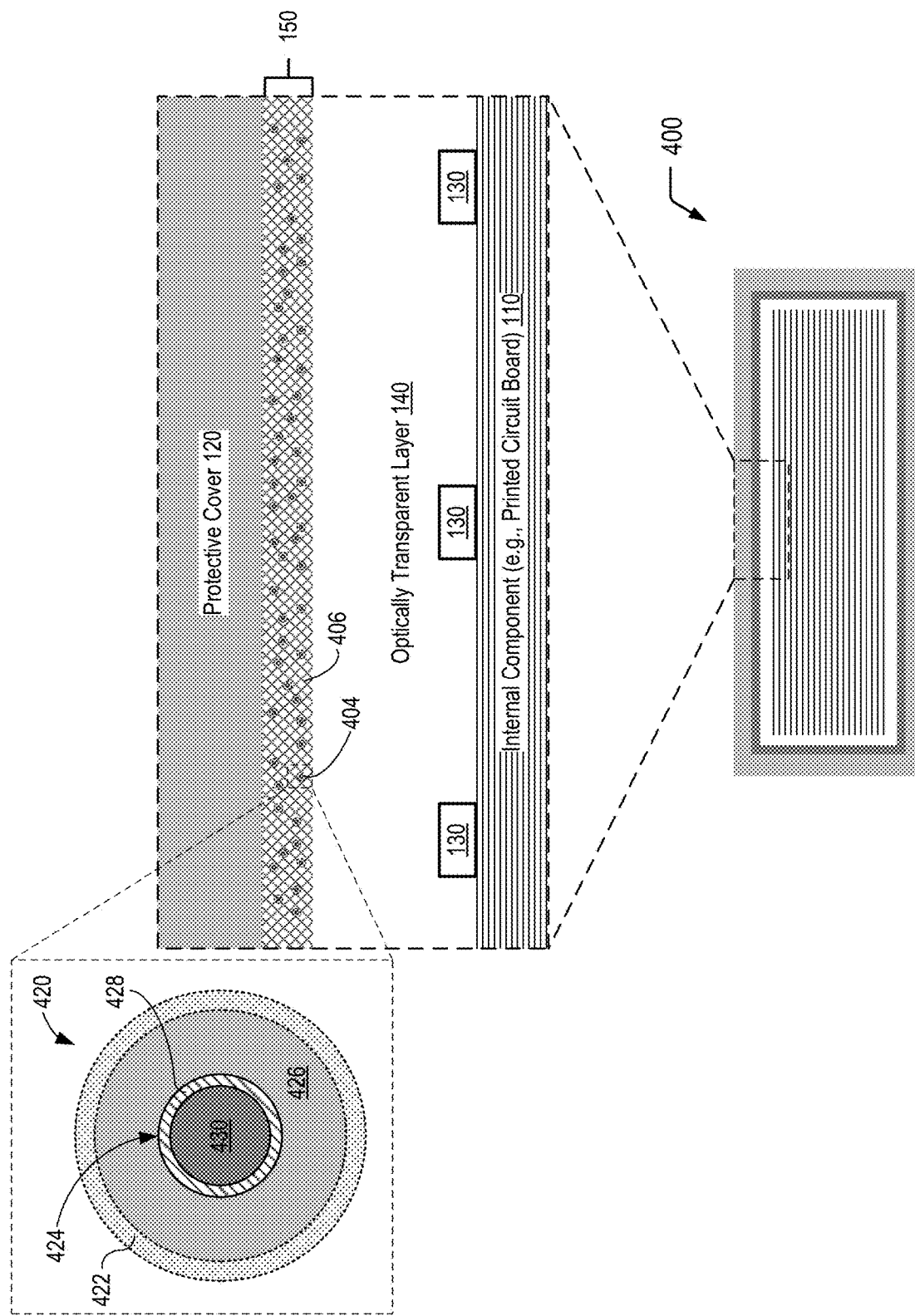

CHEMILUMINESCENCE FOR TAMPER EVENT DETECTION

BACKGROUND

In some electronic devices, physical security mechanisms may be used to protect sensitive hardware and/or software (e.g., cryptographic modules). An example of a physical security standard is the United States Government Federal Information Processing Standards (FIPS) 140-2 Security Requirements for Cryptographic Modules—Level 4. The standard states that "[a]t this security level, the physical security mechanisms provide a complete envelope of protection around the cryptographic module with the intent of detecting and responding to all unauthorized attempts at physical access" (FIPS 140-42).

SUMMARY

According to an embodiment, a secured device is disclosed that includes an electronic component and a protective cover surrounding the electronic component. The secured device also includes one or more chemiluminescent reactant layers and a light sensor that is electrically connected to the electronic component. The one or more chemiluminescent reactant layers are disposed between the protective cover and the electronic component and include multiple reactants that undergo a chemiluminescent reaction. The light sensor is configured to trigger one or more tamper response operations responsive to detection of a photon generated by the chemiluminescent reaction.

According to another embodiment, a process of utilizing chemiluminescence for tamper event detection is disclosed. The process includes detecting, by a light sensor, a photon generated by a chemiluminescent reaction. The light sensor is electrically connected to an electronic component of a secured device that includes a protective cover surrounding the electronic component. A compressive force associated with a physical access attempt results in the chemiluminescent reaction within one or more chemiluminescent reactant layers disposed between the protective cover and the electronic component. The process also includes triggering one or more tamper response operations responsive to detecting the photon generated by the chemiluminescent reaction.

According to another embodiment, an electronic device is disclosed that includes a printed circuit board that includes a light sensor disposed on a surface of the printed circuit board. An optically transparent layer overlies the surface of the printed circuit board, and one or more chemiluminescent reactant layers overly the optically transparent layer. The one or more chemiluminescent reactant layers include multiple reactants that undergo a chemiluminescent reaction. The electronic device also includes a protective cover that surrounds the one or more chemiluminescent reactant layers, the optically transparent layer, and the printed circuit board. The light sensor is configured to trigger one or more tamper response operations responsive to detection of a photon generated by the chemiluminescent reaction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4A is a cross-sectional view of selected portions of a secured device that utilizes chemiluminescence for tamper event detection, in which microcapsules are utilized to isolate reactants that undergo a chemiluminescent reaction, according to one embodiment.

DETAILED DESCRIPTION

Figure 1:
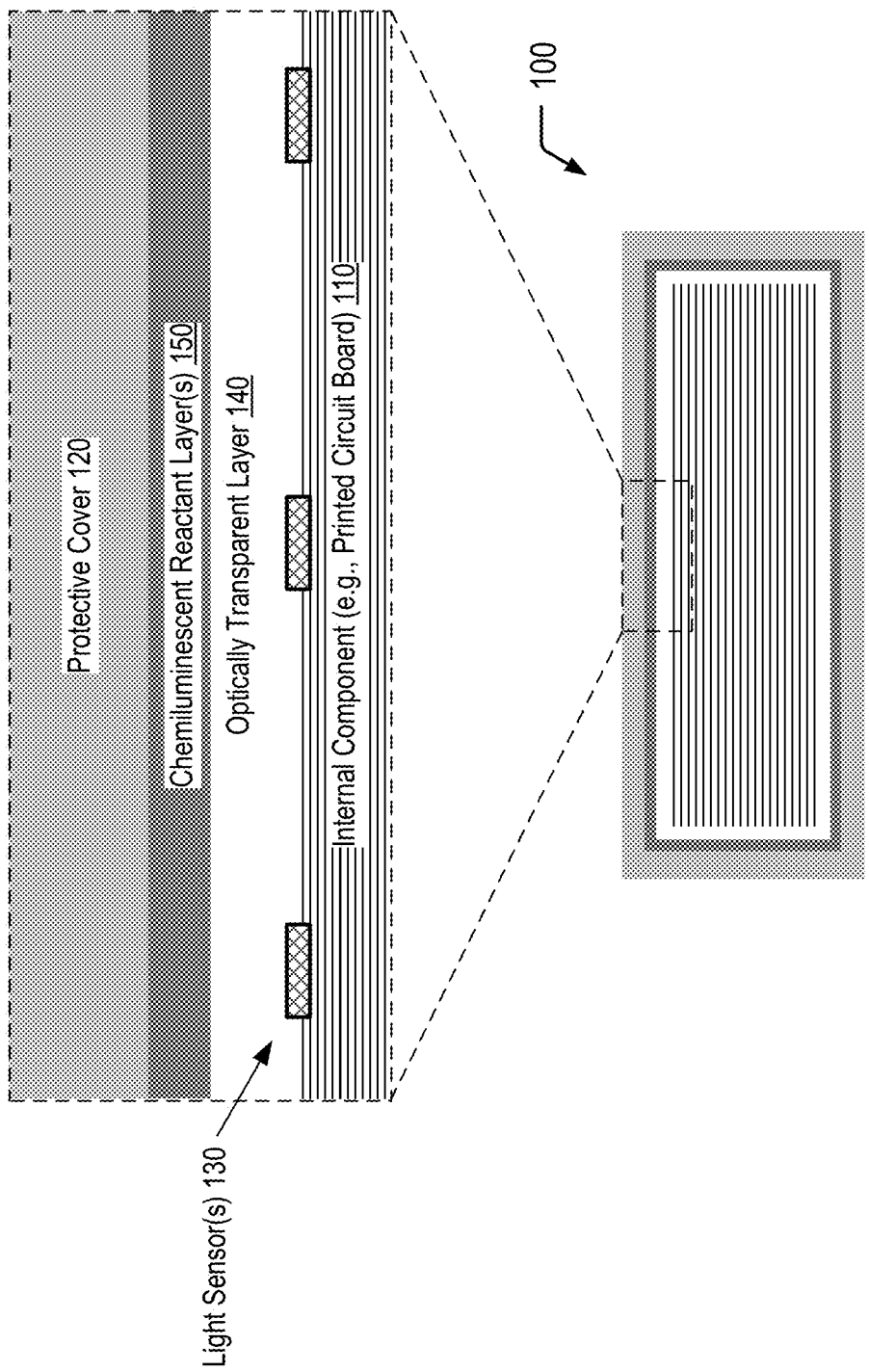
FIG. 1 is a diagram illustrating a secured device that utilizes chemiluminescence for tamper event detection, according to one embodiment.

Secured devices, such as encryption modules, that are resistant to physical tampering are used in various computing systems to protect sensitive data and components. For example, stored data that might be effectively invulnerable to unauthorized access via software protocols might be relatively easily accessed by direct, physical means, even if the stored data is notionally protected by encryption. Such physical access might entail drilling through, or physical removal of, portions of an outer casing or packaging of an electronic component. Physical access to internal device components might allow various data protective features of the device to be overridden or avoided such that otherwise protected data could be accessed. For example, by making direct electrical connections to various internal components, an encryption module might be effectively disabled or overridden. Alternatively, physical access to internal device components might allow incoming and outgoing data to be monitored or redirected in an unauthorized manner. Furthermore, in some instances, even physical access to internal components merely for purposes of studying a device might be harmful from the standpoint of security in similar installed devices.

The present disclosure describes utilizing chemiluminescence for tamper event detection in a secured device that is designed to be resistant to physical tampering in order to protect sensitive data and/or components of the secured device. Chemiluminescence is the emission of photons as the result of a chemical reaction. In the present disclosure, the secured device may include one or more chemiluminescent reactant layers that include reactants that undergo a chemiluminescent reaction when mixed. An attempt to physically access the secured device may cause the reactants to mix, resulting in the chemiluminescent reaction. The secured device may include one or more light sensors configured to detect photons generated within the chemiluminescent reactant layer(s) as a result of the chemiluminescent reaction. The light sensor(s) may be configured to trigger one or more tamper response operations (e.g., erasing data, disabling component(s), etc.).

In a particular embodiment, the secured device may include multiple chemiluminescent reactant layers and a fracturable barrier layer (e.g., glass) positioned between the individual chemiluminescent reactant layers. In this case, an attempt to physically access the secured device may result in application of a compressive force that fractures the barrier layer, enabling a first reactant (or a first set of multiple reactants) in a first chemiluminescent reactant layer to mix with a second reactant (or a second set of multiple reactants) in a second chemiluminescent reactant layer, resulting in the chemiluminescent reaction. In another embodiment, the secured device may include light generating microcapsules dispersed within a chemiluminescent reactant layer. The microcapsules include multiple compartments to isolate the first reactant(s) from the second reactant(s) within the same microcapsule, such as shell-in-shell microcapsules. In this case, an attempt to physically access the secured device may result in application of a compressive force to the microcapsule. The compressive force may result in rupture of an inner shell, enabling the first reactant(s) and the second reactant(s) to mix and undergo a chemiluminescent reaction within the microcapsule. An outer shell of the microcapsule may be formed from a material that enables a substantial portion of the light generated within the microcapsule to exit the microcapsule for detection by the light sensor(s) of the secured device.

As used herein, the term "light" is used to refer to ultraviolet (UV) light (in a wavelength range of 10 nm to 400 nm), visible light (e.g., in a wavelength range of 400 nm to 700 nm), or infrared light (e.g., above 700 nm) that may be produced as a result of a chemiluminescent reaction. As used herein, the term "microcapsule" is used to refer to capsules that are in a range of about 10 microns to 1000 microns in diameter. However, it will be appreciated that the following disclosure may be applied to capsules having a smaller size (also referred to as "nanocapsules").

FIG. 1 illustrates a cross-sectional view of a portion of a secured device 100 that utilizes chemiluminescence for tamper event detection, according to one embodiment. In FIG. 1, the secured device 100 includes an internal component 110 and a protective cover 120 surrounding the internal component 110. The internal component 110 may correspond to a printed circuit board, a packaged integrated circuit, a microchip, a microprocessor, an electronic card device, a cartridge device, a cryptographic module, or combinations thereof, among other alternatives. The secured device 100 includes one or more light sensors 130 that may be disposed on one or more surfaces of the internal component 110, and an optically transparent layer 140 is positioned between the light sensor(s) 130 and one or more chemiluminescent reactant layers 150 disposed on an inner surface of the protective cover 120. As further described herein, an attempt to physically access the internal component 110 of the secured device 100 may result in a chemiluminescent reaction within the chemiluminescent reactant layer(s) 150 of the secured device 100. The optically transparent layer 140 may enable photons generated within the chemiluminescent reactant layer(s) 150 as a result of the physical access attempt to be detected by the light sensor(s) 130. As described further herein, one or more tamper response operations may be performed responsive to detection of photons by the light sensor(s) 130. Thus, FIG. 1 depicts an example of the utilization of chemiluminescence for tamper event detection.

Figure 3A:
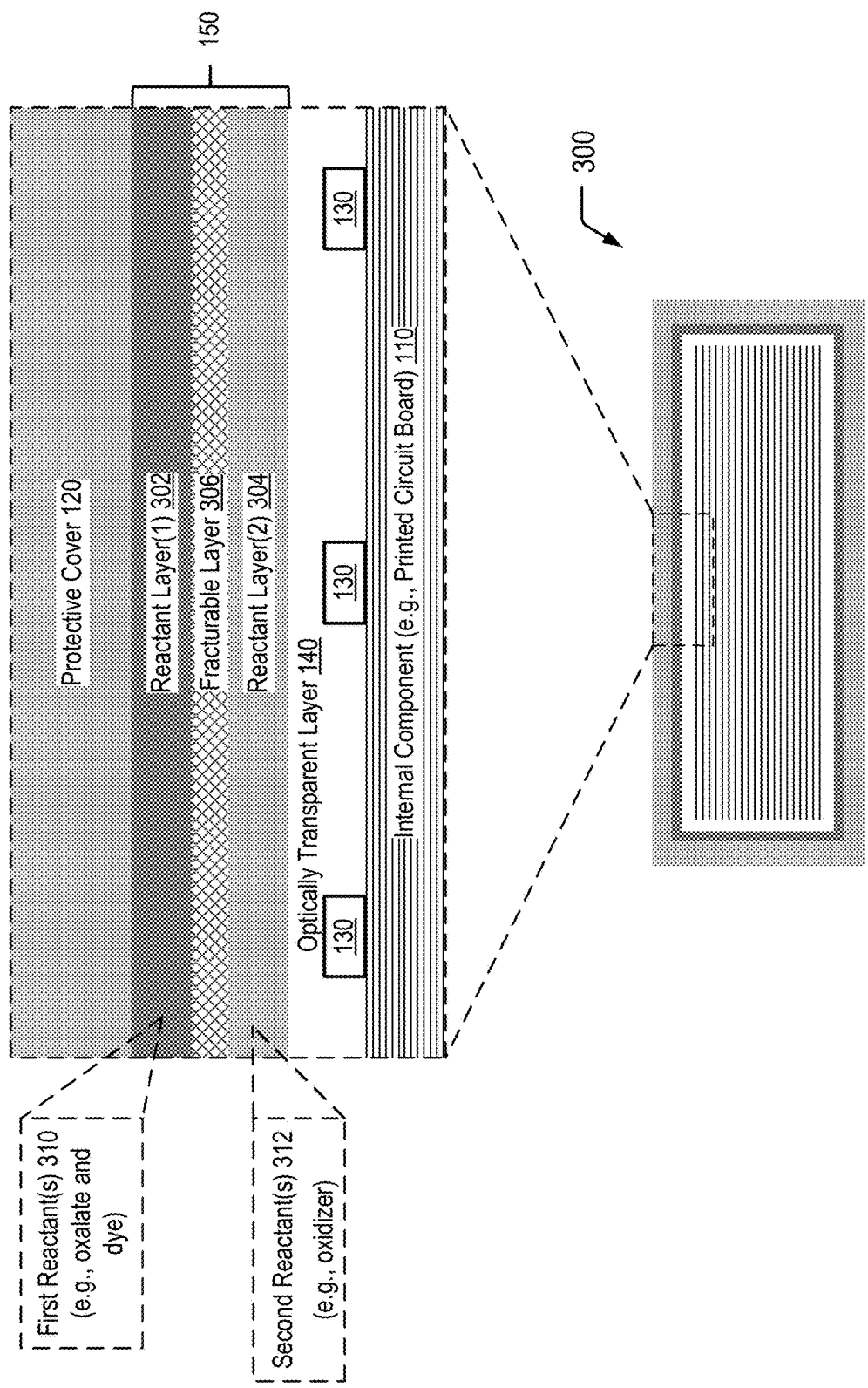
FIG. 3A is a cross-sectional view of selected portions of a secured device that utilizes chemiluminescence for tamper event detection, in which fracturable layer is utilized to isolate reactants that undergo a chemiluminescent reaction, according to one embodiment.

In some cases, the chemiluminescent reactant layer(s) 150 may include a fracturable barrier layer (e.g. glass) positioned between a first chemiluminescent reactant layer and a second chemiluminescent reactant layer, as illustrated and further described herein with respect to FIG. 3A. In other cases, the chemiluminescent reactant layer(s) 150 may correspond to a matrix material having light generating microcapsules dispersed therein, as illustrated and further described herein with respect to FIG. 4A. As illustrated and further described herein with respect to FIGS. 3B and 4B, an attempt to physically access the internal component 110 of the secured device 100 may result in a chemiluminescent reaction within the chemiluminescent reactant layer(s) 150. Detection of photons generated within the chemiluminescent reactant layer(s) 150 by the light sensor(s) 130 may trigger one or more tamper response operations.

The optically transparent layer 140 may be sufficiently transparent to photons of a particular wavelength within a photon emission distribution spectrum associated with a particular chemiluminescent reaction to enable at least a portion of the photons generated within the chemiluminescent reactant layer(s) 150 to reach the light sensor(s) 130. While not shown in the example of FIG. 1, in some cases, a reflective layer may be positioned between the chemiluminescent reactant layer(s) 150 and the protective cover 120 to increase the number of photons that are directed towards the light sensor(s) 130.

The light sensor(s) 130 may enable passive detection of a physical access attempt. In some cases, the secured device 100 may include or may be electrically connected to a battery (not shown in FIG. 1) that may be utilized to power the tamper response operation(s). Alternatively, the light sensor(s) 130 may correspond to one or more photovoltaic devices that may enable conversion of light resulting from the chemiluminescent reaction into electricity in order to power the tamper response operation(s) or to activate a switch which connects a battery to the secured device 100.

In a particular embodiment, the tamper response operation(s) may correspond to one or more actions to prevent or limit access to a component (e.g., the internal component 110) of the secured device 100. To illustrate, the action(s) may include shutting down the internal component 110 or a portion thereof, transmitting an alarm signal to the internal component 110, transmitting an alarm signal to an external component, sounding an audible alarm, triggering a visual alarm, rendering the internal component 110 inoperable, physically destroying the internal component 110 or a portion thereof, erasing electronically stored data, encrypting internal data, overwriting stored data with dummy data, or any combination thereof (among other alternatives).

Thus, FIG. 1 illustrates an example of a secured device that utilizes chemiluminescence for tamper event detection. In some cases, the tamper detection capability of the secured device of FIG. 1 may be sufficient to satisfy FIPS 140-2 Security Requirements for Cryptographic Modules—Level 4 (among other possible security standards).

Figure 2:
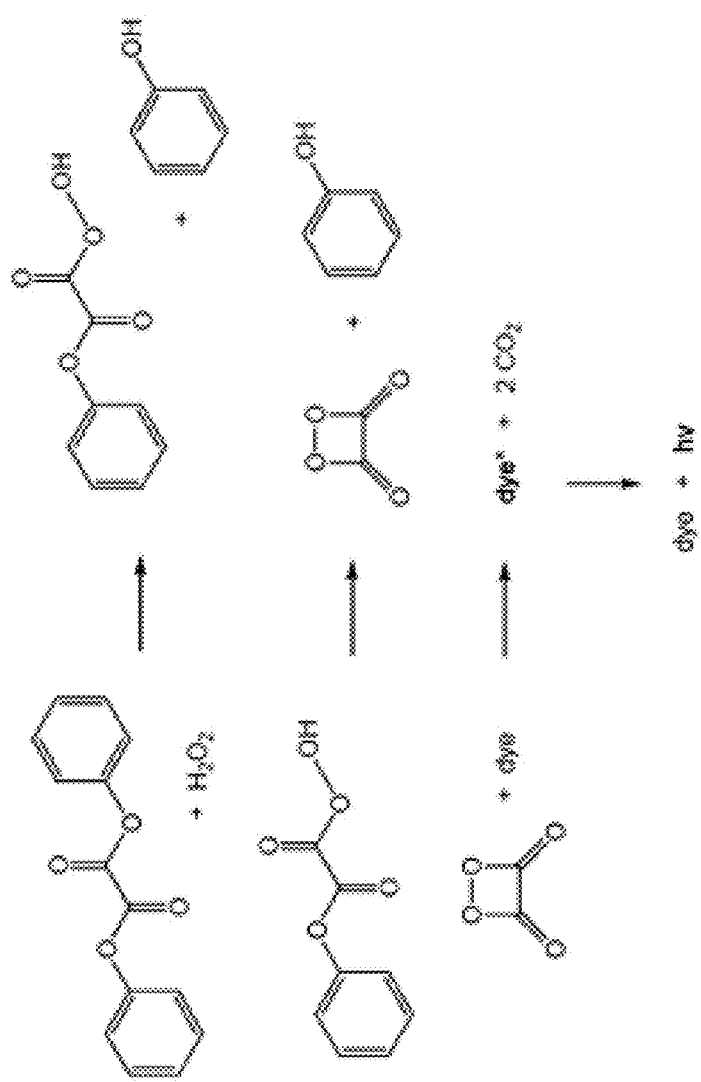
FIG. 2 is a chemical reaction diagram depicting an example of a chemiluminescent reaction that may occur within a secured device that utilizes chemiluminescence for tamper event detection, according to one embodiment.

Referring to FIG. 2, a chemical reaction diagram 200 depicts an illustrative, non-limiting example of a chemiluminescent reaction that may occur within the chemiluminescent reactant layer(s) 150.

The chemiluminescent reaction depicted in FIG. 2 includes the reaction of a dye with an oxalate (e.g., diphenyl oxalate) and a suitable oxidant (e.g., hydrogen peroxide) to produce a photon-emitting reaction. FIG. 2 illustrates that a product of a chemical reaction between diphenyl oxalate and hydrogen peroxide is 1,2-dioxetanedione that has an unstable strained ring, which decomposes spontaneously to carbon dioxide and releases energy that excites the dye, and the excited dye subsequently releases a photon as it returns to its ground state.

It will be appreciated that a variety of dyes may be selected for incorporation into the chemiluminescent reactant layer(s) 150. A particular dye may emit photons having a particular wavelength within a photon emission distribution spectrum associated with the particular dye. The light sensor(s) 130 may be configured to detect photons having wavelengths within a photon emission distribution spectrum associated with a selected dye. As an illustrative, non-limiting example, 9,10-diphenylanthracene is a dye that has a photon emission distribution spectrum with a marked emission peak at 405 nm and appreciable emission at 436 nm. In this case, the light sensor(s) 130 may be configured to detect photons within the photon emission distribution spectrum associated with 9,10-diphenylanthracene.

Figure 3B:
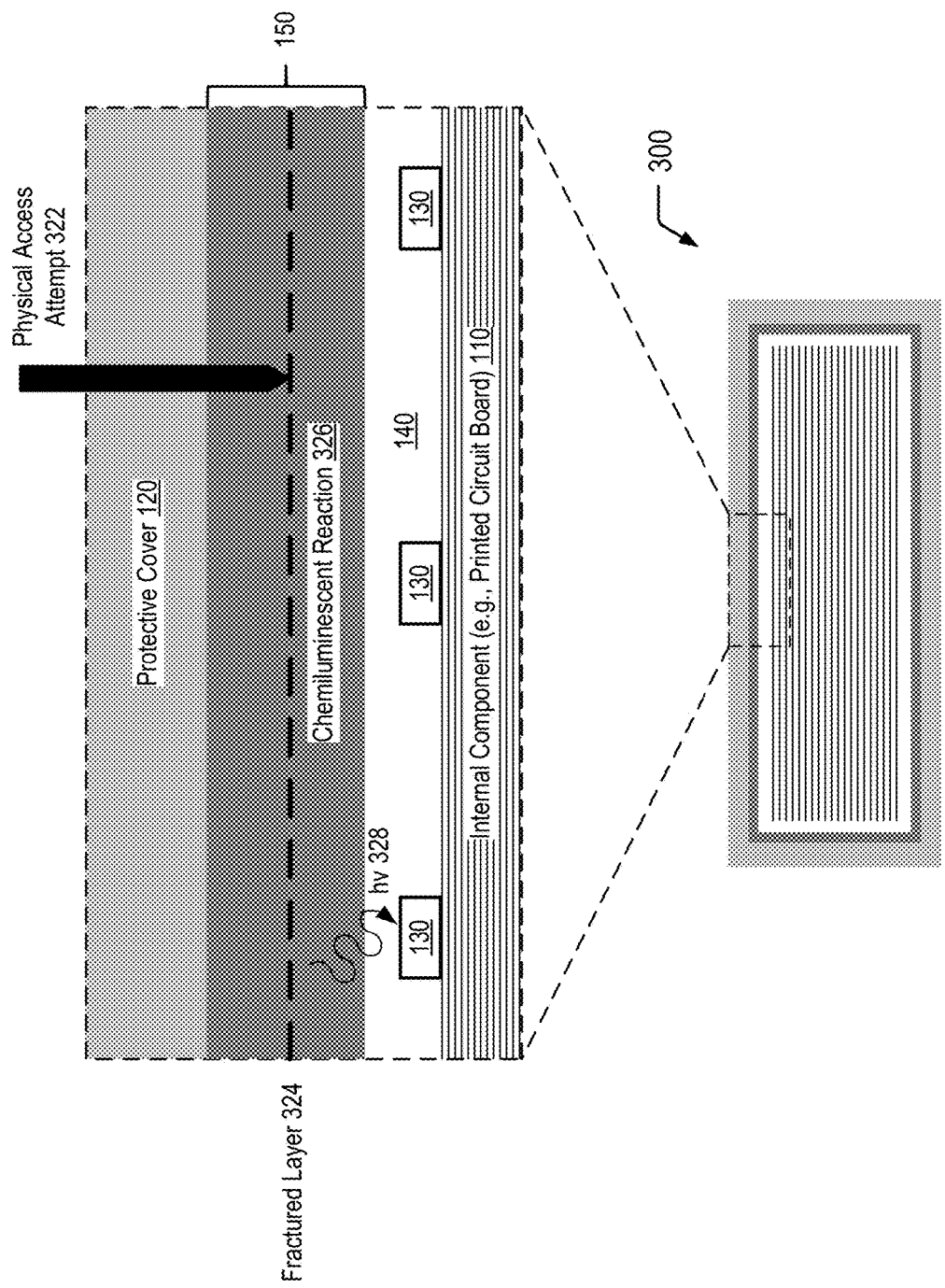
FIG. 3B is a cross-sectional view of the selected portions of the secured device of FIG. 3A after a physical access attempt results in fracture of the fracturable layer to enable the reactants to undergo the chemiluminescent reaction.
Figure 4B:
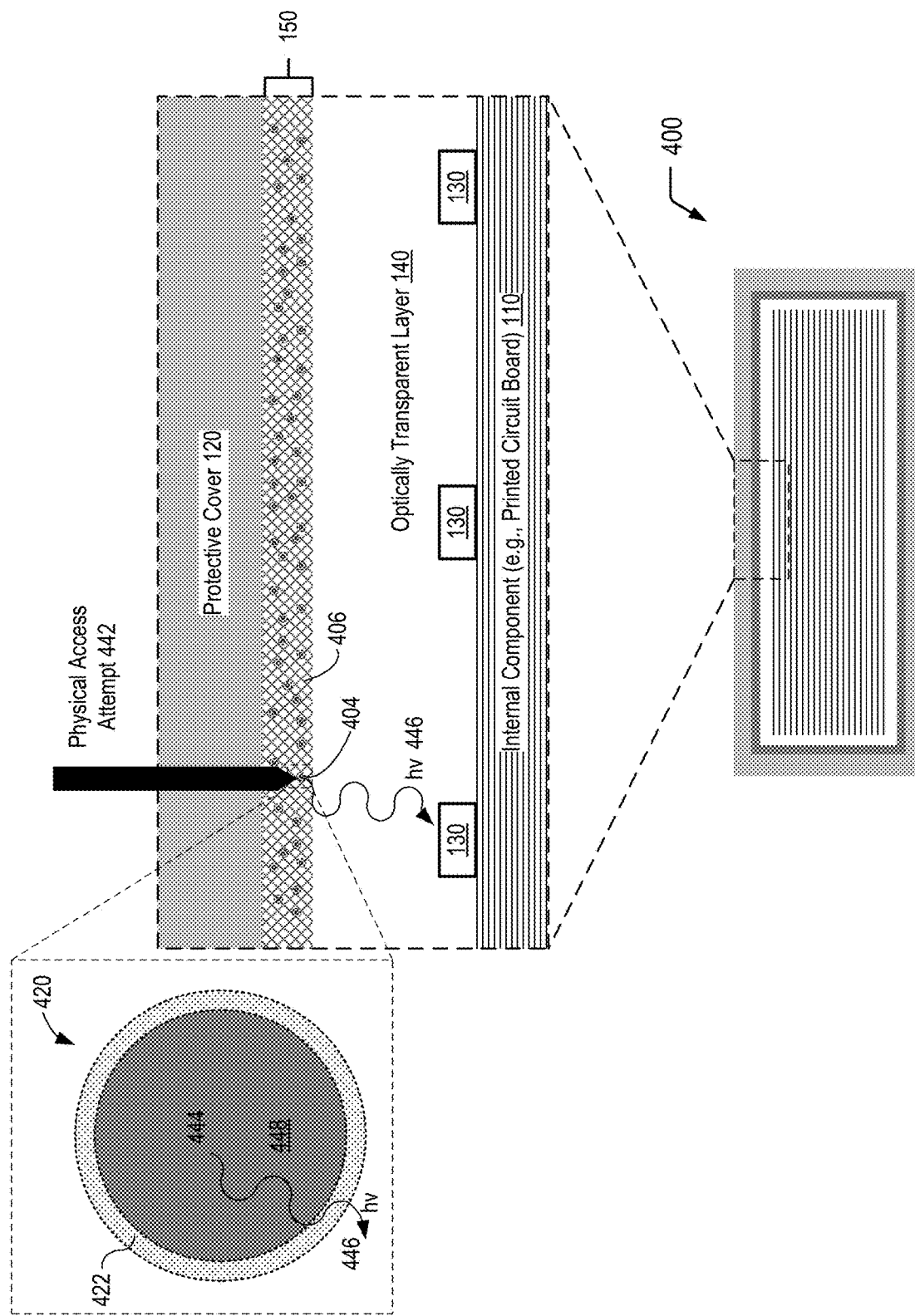
FIG. 4B is a cross-sectional view of the selected portions of the secured device of FIG. 4A after a physical access attempt results in rupture of an inner compartment of the microcapsule to enable the reactants to undergo the chemiluminescent reaction within the microcapsule.

FIGS. 3A-3B and FIGS. 4A-4B illustrate alternative examples of secured devices that utilize chemiluminescence for tamper event detection. The chemiluminescent reaction depicted in FIG. 2 represents an illustrative, non-limiting example of a photon-emitting reaction that may be utilized for tamper event detection in the embodiments depicted in FIGS. 3A-3B and FIGS. 4A-4B. FIG. 3A illustrates selected portions of a first embodiment of a secured device that utilizes a fracturable barrier layer to isolate reactants that undergo a chemiluminescent reaction. FIG. 3B illustrates that a physical access attempt may fracture the barrier layer to enable the reactants to mix and undergo the chemiluminescent reaction. FIG. 4A illustrates selected portions of a second embodiment of a secured device that includes multiple-compartment microcapsules (e.g., shell-in-shell microcapsules) to isolate reactants that undergo a chemiluminescent reaction in separate compartments. FIG. 4B illustrates that a physical access attempt may result in rupture of an inner shell of the microcapsule to enable the reactants to mix and undergo the chemiluminescent reaction within the microcapsule.

FIG. 3A illustrates a cross-sectional view of a portion of a secured device 300 that utilizes chemiluminescence for tamper event detection, according to one embodiment. The secured device 300 depicted in FIG. 3A corresponds to a first embodiment of the secured device 100 depicted in FIG. 1 that utilizes chemiluminescence for tamper event detection. In the secured device 300 depicted in FIG. 3A, the one or more chemiluminescent reactant layers 150 include a first reactant layer 302 (identified as "Reactant Layer(1)" in FIG. 3A) and a second reactant layer 304 (identified as "Reactant Layer(2)" in FIG. 3A) separated by a fracturable layer 306 (e.g., glass). The first reactant layer 302 includes a first reactant 310 (or a first set of multiple reactants), and the second reactant layer 304 includes a second reactant 312 (or a second set of multiple reactants). In FIG. 3A, the fracturable layer 306 enables isolation of the first reactant(s) 310 and the second reactant(s) 312 in order to prevent a chemiluminescent reaction between the reactants 310, 312. As illustrated and described further herein with respect to FIG. 3B, an attempt to physically access the internal component 110 of the secured device 300 may result in application of a compressive force that is sufficient to cause the fracturable layer 306 to fracture, enabling the first reactant(s) 310 and the second reactant(s) 312 to mix and undergo the chemiluminescent reaction.

In a particular embodiment, the chemiluminescent reaction may correspond to the chemiluminescent reaction of FIG. 2 that includes the reaction of a suitable dye with diphenyl oxalate and a suitable oxidant such as hydrogen peroxide to produce a photon-emitting reaction. In other cases, the chemiluminescent reaction may include a reaction that occurs upon mixing of luminol and a catalyst and hydrogen peroxide. One of ordinary skill in the art will appreciate that numerous alternative chemiluminescent reactions may be suitable for tamper event detection in the secured device 300.

FIG. 3A illustrates a particular embodiment in which the first reactant(s) 310 disposed within the first reactant layer 302 include a mixture of an oxalate and a dye (e.g., diphenyl oxalate and a dye), and the second reactant(s) 312 disposed within the second reactant layer 304 includes an oxidizer (e.g., hydrogen peroxide). Alternatively, the first reactant(s) 310 disposed within the first reactant layer 302 may include an oxidizer, and the second reactant(s) 312 disposed within the second reactant layer 304 may include a mixture of an oxalate and a dye.

FIG. 3B illustrates a cross-sectional view of a portion of the secured device 300 of FIG. 3A after a physical access attempt 322 results in fracture of the fracturable layer 306 (identified as a fractured layer 324 in FIG. 3B), enabling the reactants 310, 312 to mix and undergo a chemiluminescent reaction 326 within the chemiluminescent reactant layer(s) 150.

FIG. 3B further illustrates that the chemiluminescent reaction 326 generates light 328 (identified as "hv" in FIG. 3B) within the chemiluminescent reactant layer(s) 150 that may pass through the optically transparent layer 140 for detection by the light sensor(s) 130. As illustrated and described further herein with respect to FIG. 2, a product of a chemical reaction between diphenyl oxalate and hydrogen peroxide is 1,2-dioxetanedione that has an unstable strained ring, which decomposes spontaneously to carbon dioxide and releases energy that excites the dye, and the excited dye subsequently releases a photon as it returns to its ground state. As described further herein, the chemiluminescent reaction generates photons within a particular wavelength range that is detectable by the light sensor(s) 130 of the secured device 300.

Responsive to detection of photons generated within the chemiluminescent reactant layer(s) 150, the light sensor(s) 130 may be configured to trigger one or more tamper response operations. In a particular embodiment, the tamper response operation(s) may correspond to one or more actions to prevent or limit access to a component (e.g., the internal component 110) of the secured device 300. To illustrate, the action(s) may include shutting down the internal component 110 or a portion thereof, transmitting an alarm signal to the internal component 110, transmitting an alarm signal to an external component, sounding an audible alarm, triggering a visual alarm, rendering the internal component 110 inoperable, physically destroying the internal component 110 or a portion thereof, erasing electronically stored data, encrypting internal data, overwriting stored data with dummy data, or any combination thereof (among other alternatives).

Thus, FIG. 3B illustrates an example of a secured device that utilizes chemiluminescence for tamper event detection, in which a physical access attempt results in fracture of a barrier layer that isolates reactants that undergo a chemiluminescent reaction when mixed. The fracture enables the reactants to mix and undergo the chemiluminescent reaction, generating photons that are detectable by the light sensor(s)

of the secured device. One or more tamper response operations may be performed responsive to detection of the photons by the light sensor(s).

FIG. 4A illustrates a cross-sectional view of a portion of a secured device 400 that utilizes chemiluminescence for tamper event detection, according to one embodiment. The secured device 400 depicted in FIG. 4A corresponds to a second embodiment of the secured device 100 depicted in FIG. 1 that utilizes chemiluminescence for tamper event detection. In the secured device 400 depicted in FIG. 4A, the chemiluminescent reactant layer(s) 150 include a plurality of microcapsules 404 dispersed in a matrix material 406. The microcapsules 404 illustrated in FIG. 4A include multiple compartments and are also referred to herein as multiple-compartment microcapsules or light generating microcapsules. In FIG. 4A, the microcapsules 404 are shown prior to application of a compressive force associated with a physical access attempt that results in a chemiluminescent reaction within the individual microcapsules 404. Accordingly, FIG. 4A illustrates that the compartments of the microcapsules 404 enable isolation of reactants in order to prevent the chemiluminescent reaction prior to application of the compressive force associated with the physical access attempt.

In a particular embodiment, the chemiluminescent reaction may correspond to the chemiluminescent reaction of FIG. 2 that includes the reaction of a suitable dye with diphenyl oxalate and a suitable oxidant such as hydrogen peroxide to produce a photon-emitting reaction. In other cases, the chemiluminescent reaction may include a reaction that occurs upon mixing of luminol and a catalyst and hydrogen peroxide. One of ordinary skill in the art will appreciate that numerous alternative chemiluminescent reactions may be suitable for tamper event detection in the secured device 400.

In the particular embodiment depicted in FIG. 4A, the microcapsules 404 dispersed in the matrix material 406 have a shell-in-shell architecture with an inner shell contained within an outer shell, where the inner shell is adapted to rupture in response to application of a compressive force in order to trigger a chemiluminescent reaction within the microcapsules 404. Thus, the individual microcapsules 404 may correspond to the multiple-compartment microcapsule (having a shell-in-shell architecture) formed according to the process described herein with respect to FIG. 5. It will be appreciated that, in alternative embodiments, the microcapsules 404 may have an alternative multiple-compartment microcapsule design, may include more than one type of multiple-compartment microcapsule design, or a combination thereof.

FIG. 4A further includes an exploded cross-sectional view of an individual microcapsule 420 of the plurality of microcapsules 404 prior to application of a compressive force associated with a physical access attempt, as depicted in FIG. 4B. The exploded cross-sectional view illustrates that the microcapsule 420 has an outer wall 422 (also referred to herein as the "outer shell") and contains an inner microcapsule 424 and a first reactant 426 (or a first set of multiple reactants). The inner microcapsule 424 has a capsule wall 428 (also referred to herein as the "inner shell") and contains a second reactant 430 (or a second set of multiple reactants). The first reactant(s) 426 within the microcapsule 420 may surround the inner microcapsule 424, and the first reactant(s) 426 may be prevented from contacting the second reactant(s) 430 by the capsule wall 428 of the inner microcapsule 424. In a particular embodiment, the capsule wall 428 of the inner microcapsule 424 may be formed to rupture under a particular compressive force, and the outer wall 422 of the microcapsule 420 may be formed so as to not rupture under that compressive force.

As illustrated and further described herein with respect to FIG. 4B, a physical access attempt may result in rupture of the capsule wall 428 of the inner microcapsule 424, allowing the first reactant(s) 426 and the second reactant(s) 430 to mix and undergo a chemiluminescent reaction. To illustrate, in some cases, the first reactant(s) 426 may correspond to hydrogen peroxide, and the second reactant(s) 430 may correspond to a mixture of a dye and diphenyl oxalate. As illustrated and described further herein with respect to FIG. 2, a product of a chemical reaction between diphenyl oxalate and hydrogen peroxide is 1,2-dioxetanedione that has an unstable strained ring, which decomposes spontaneously to carbon dioxide and releases energy that excites the dye, and the excited dye subsequently releases a photon as it returns to its ground state.

As described further herein, the chemiluminescent reaction generates photons within a particular wavelength range that is detectable by the light sensor(s) 130 of the secured device 400. The outer wall 422 of the microcapsule 420 allows a substantial portion of the photons generated within the microcapsule 420 as a result of the chemiluminescent reaction to pass through the outer wall 422 into the surrounding matrix material 406 and into the adjacent optically transparent layer 140. The outer wall 422 can be made from chemically non-reactive materials, such as some plastics which are transparent, translucent, or light filtering to pass the curing wavelengths of light from chemiluminescent light source into the interface material 406. In an embodiment, the outer wall 422 has a transmittance value of at least 90% for the particular emitted photon wavelength(s). In certain embodiments, the outer wall 422 may include a natural polymeric material, such as gelatin, arabic gum, shellac, lac, starch, dextrin, wax, rosin, sodium alginate, zein, and the like; semi-synthetic polymer material, such as methyl cellulose, ethyl cellulose, carboxymethyl cellulose, hydroxyethyl ethyl cellulose; full-synthetic polymer material, such as polyolefins, polystyrenes, polyethers, polyureas, polyethylene glycol, polyamide, polyurethane, polyacrylate, epoxy resins, among others.

Thus, FIG. 4A illustrates an example of a secured device having a chemiluminescent layer that includes light generating microcapsules dispersed in a matrix material. In FIG. 4A, the microcapsules are shown prior to application of a compressive force to the microcapsules that is associated with a physical access attempt. Accordingly, the compartment(s) of the microcapsules isolate reactants that undergo a chemiluminescent reaction. As described further herein with respect to FIG. 4B, a physical access attempt results in rupture of the capsule wall of the inner microcapsule, allowing the reactants to mix and undergo the chemiluminescent reaction.

FIG. 4B illustrates a cross-sectional view of a portion of the secured device 400 of FIG. 4A after a physical access attempt 442 results in application of a compressive force to the microcapsules 404, according to one embodiment. FIG. 4B illustrates that the compressive force associated with the physical access attempt 442 results in a chemiluminescent reaction within the individual microcapsules 404.

In FIG. 4B, an exploded cross-sectional view illustrates the individual microcapsule 420 of FIG. 4A after application of a particular compressive force to the microcapsules 404 dispersed in the matrix material 406. FIG. 4B illustrates that compression of the microcapsules 404 results in rupture of the capsule wall 428 of the inner microcapsule 424 depicted in FIG. 4A to allow the first reactant(s) 426 and the second reactant(s) 430 to mix and undergo a chemiluminescent reaction (identified by the reference character 444 in FIG. 4B). FIG. 4B further illustrates that, in some embodiments, application of the particular compressive force does not result in rupture of the outer wall 422 of the microcapsule 420.

FIG. 4B illustrates that the chemiluminescent reaction 444 that occurs within the microcapsule 420 generates light 446 (identified as "hv" in FIG. 4B), and the outer wall 422 of the microcapsule 420 allows a substantial portion of the light 446 (or particular wavelength(s) of the light 446) to pass through the outer wall 422 into the surrounding matrix material 406 and into the adjacent optically transparent layer 140. As described further herein, the light 446 is within a particular wavelength range that is detectable by the light sensor(s) 130 of the secured device 400. FIG. 4B further illustrates that the microcapsule 420 may contain a reaction product 448 of the reaction of the first reactant(s) 426 and the second reactant(s) 430. As the outer wall 422 remains intact after application of the particular compressive force, the outer wall 422 may prevent the reaction product 448 from contacting the matrix material 406.

Thus, FIG. 4B illustrates an example a secured device that utilizes chemiluminescence for tamper event detection, in which a physical access attempt results in rupture of an inner compartment of a multiple-compartment microcapsule that isolates reactants that undergo a chemiluminescent reaction. The rupture of the inner compartment enables the reactants to mix and undergo the chemiluminescent reaction, generating photons that are detectable by light sensor(s) of the secured device. One or more tamper response operations may be performed responsive to detection of the photons by the light sensor(s).

Figure 5:
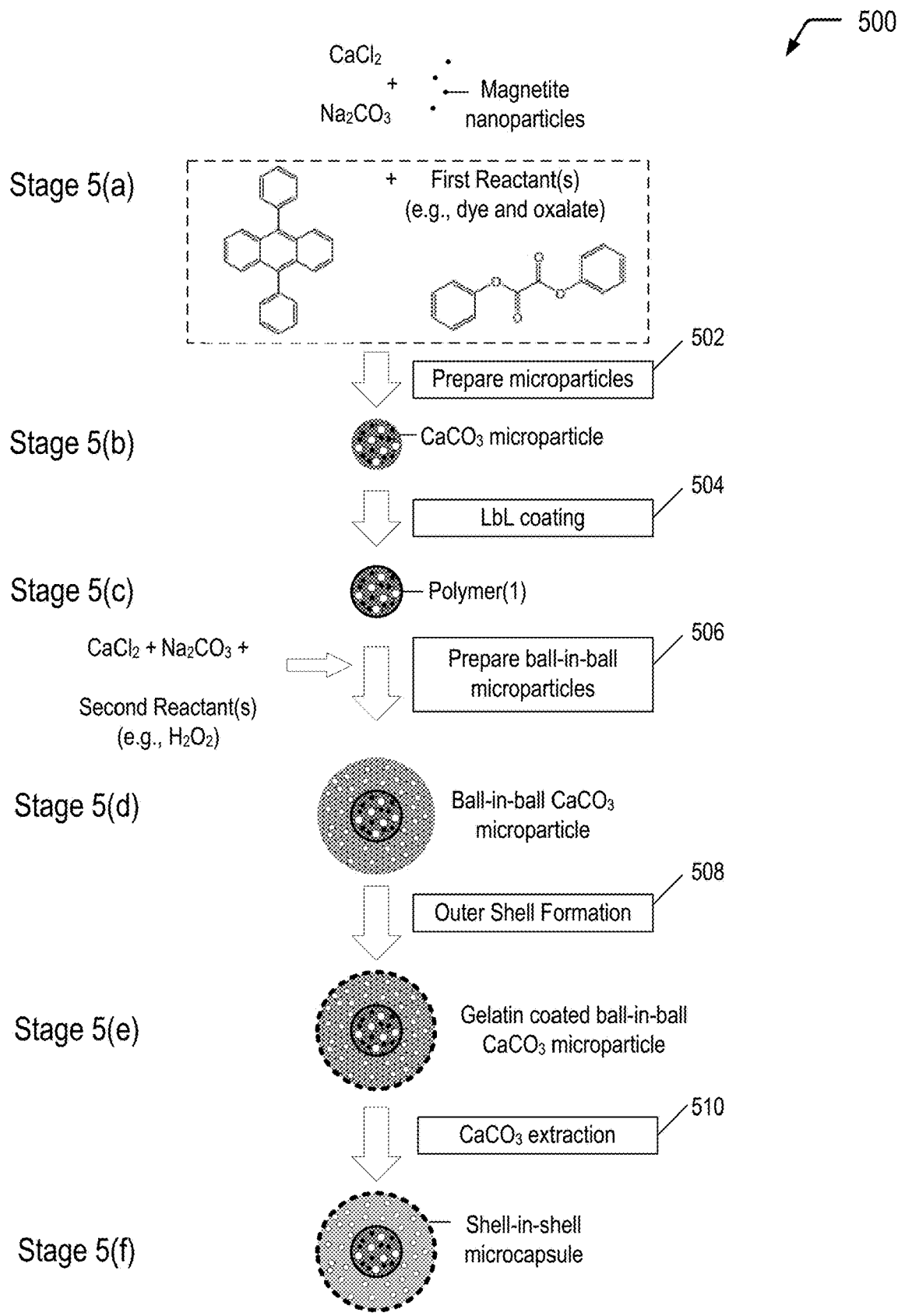
FIG. 5 is a flow diagram illustrating a method of producing a multiple-compartment microcapsule having a shell-in-shell architecture with an inner shell contained within an outer shell, where the inner shell is adapted to rupture in response to application of a compressive force to cause a chemiluminescent reaction within the microcapsule, according to some embodiments.

FIG. 5 is a flow diagram illustrating, through stages 5(a) to 5(f), an example of a method 500 of producing a multiple-compartment microcapsule having a shell-in-shell architecture with an inner shell contained within an outer shell, where the inner shell is adapted to rupture in response to application of a compressive force to cause a chemiluminescent reaction within the microcapsule, according to some embodiments. The microcapsule produced in FIG. 5 may correspond to the microcapsules 404 depicted in FIG. 4A.

In each of the stages 5(a)-5(f), the structure is shown in a cross-sectional side view. Referring to FIG. 5, and according to an embodiment, the shell-in-shell microcapsules can be made using any reactants and oxidants of any chemiluminescent reaction (identified as "First Reactant(s)" and "Second Reactant(s)" in FIG. 5). For example, First Reactant(s) may be a dye and diphenyl oxalate, and Second Reactant(s) may be an oxidant such as hydrogen peroxide. Once the inner shell ruptures, the reactants mix and emit photons. One skilled in the art will understand that a variety of chemiluminescent reactants can be used. Both the First Reactant(s) and the Second Reactant(s) may comprise one or more chemicals, particles, and combinations thereof. To illustrate, the First Reactant(s) may include a mixture of luminol and a catalyst, and the Second Reactant(s) may include hydrogen peroxide.

In the example depicted in FIG. 5, magnetic nanoparticles are used in operation 502 for incorporation into the "inner core" $CaCO_3$ microparticles (shown at stage 5(b)). Magnetic nanoparticles are incorporated into the "inner core" $CaCO_3$ microparticles for the purpose of subsequently magnetically isolating the product prepared in operation 506 (i.e., ball-in-ball $CaCO_3$ microparticles) from a coproduct (i.e., single core $CaCO_3$ microparticles). The magnetic nanoparticles may be, for example, $Fe_3O_4$ (also referred to as "magnetite") nanoparticles, cobalt ferrite nanoparticles or other magnetic nanoparticles known in the art. In a particular embodiment, the magnetic nanoparticles may have a diameter in a range of approximately 6 nm to 25 nm.

An example of a technique of preparing magnetite nanoparticles follows. A 5 mol/l NaOH solution is added into a mixed solution of 0.25 mol/l ferrous chloride and 0.5 mol/l ferric chloride (molar ratio 1:2) until obtaining pH 11 at room temperature. The slurry is washed repeatedly with distilled water. Then, the resulting magnetite nanoparticles are magnetically separated from the supernatant and redispersed in aqueous solution at least three times, until obtaining pH 7. A typical average diameter of the resulting magnetite nanoparticles may be about 12 nm.

The microparticle system described with respect to FIG. 5 is based on $CaCO_3$ microparticles that are hardened by formation of a polyelectrolyte multilayer around the $CaCO_3$ microparticles. The method 500 begins by preparing spherical calcium carbonate microparticles in which magnetite nanoparticles and First Reactant(s) (e.g., diphenyl oxalate and a dye, such as 9,10-diphenylanthracene) are immobilized by coprecipitation (operation 502). For example, 1 M $CaCl_2$ (0.615 mL), 1 M $Na_2CO_3$ (0.615 mL), 1.4% (w/v) magnetite nanoparticle suspension (50 μL), First Reactant(s) (0.50 mg dye and 133 mg oxalate), and deionized water (2.450 mL) may be rapidly mixed and thoroughly agitated on a magnetic stirrer for about 20 seconds at about room temperature. After the agitation, the precipitate may be separated from the supernatant by centrifugation and washed three times with water. The diameter of the $CaCO_3$ microparticles produced with a reaction time of 20 seconds is about 4 μm to about 6 μm. Smaller $CaCO_3$ microparticles are produced if the reaction time is reduced from about 20 seconds to about several seconds. One of the resulting $CaCO_3$ microparticles is shown at stage 5(b).

In this example, the fabrication of polyelectrolyte capsules is based on the layer-by-layer (LbL) self-assembly of polyelectrolyte thin films. Such polyelectrolyte capsules are fabricated by the consecutive adsorption of alternating layer of positively and negatively charged polyelectrolytes onto sacrificial colloidal templates. Calcium carbonate is but one example of a sacrificial colloidal template. One skilled in the art will appreciate that other templates may be used in lieu of, or in addition to, calcium carbonate.

The method 500 continues by LbL coating the $CaCO_3$ microparticles (operation 504). In operation 504, a polyelectrolyte multilayer (PEM) build-up may be employed by adsorbing five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the $CaCO_3$ microparticles produced in operation 502 may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolyte may be repeated five times and, consequently, five PSS/PAH bilayers are deposited on the surface of the $CaCO_3$ microparticles. One of the resulting polymer coated $CaCO_3$ microparticles is shown at stage 5(c).

The thickness of this "inner shell" polyelectrolyte multilayer may be varied by changing the number of bilayers. In some cases, it may be desirable for the inner shell to rupture while the outer shell remains intact. Typically, for a given shell diameter, thinner shells rupture more readily than thicker shells. Hence, in accordance with some embodiments of the present disclosure, the inner shell is made relatively thin compared to the outer shell. On the other hand, the inner shell must not be so thin as to rupture prematurely.

The PSS/PAH-multilayer in operation 504 is but one example of a polyelectrolyte multilayer. One skilled in the art will appreciate that other polyelectrolyte multilayers and other coatings may be used in lieu of, or in addition to, the PSS/PAH-multilayer in operation 504.

The method 500 continues by preparing ball-in-ball calcium carbonate microparticles in which Second Reactant(s) (which can be any suitable oxidant, including hydrogen peroxide) is immobilized by a second coprecipitation (operation 506). "Immobilize" means "removing from general circulation, for example by enclosing in a capsule." The ball-in-ball $CaCO_3$ microparticles are characterized by a polyelectrolyte multilayer that is sandwiched between two calcium carbonate compartments. In operation 506, the polymer coated $CaCO_3$ microparticles may be resuspended in 1M $CaCl_2$ (0.615 mL), 1M $Na_2CO_3$ (0.615 mL), and deionized water (2.500 mL) containing hydrogen peroxide (1 mg), rapidly mixed and thoroughly agitated on a magnetic stirrer for about 20 seconds at about room temperature. After the agitation, the precipitate may be separated from the supernatant by centrifugation and washed three times with water. The second coprecipitation is accompanied by formation of a coproduct, i.e., single core $CaCO_3$ microparticles that contain only hydrogen peroxide. The ball-in-ball $CaCO_3$ microparticles, which are magnetic due to the immobilized magnetite nanoparticles in the inner compartment, may be isolated by applying an external magnetic field to the sample while all of the nonmagnetic single core $CaCO_3$ microparticles are removed by a few washing steps. One of the resulting ball-in-ball $CaCO_3$ microparticles is shown at stage 5(*d*).

In an embodiment, the outer shell wall material is made of a material for the chemiluminescent photon to escape the shell. In another embodiment, the outer shell wall material is made of a material where the photon yield outside the wall of the outer shell wall is maximized. In an embodiment, the outer shell wall has a transmittance of at least 90%. In certain embodiments, the outer shell wall material may include natural polymeric material, such as gelatin, arabic gum, shellac, lac, starch, dextrin, wax, rosin, sodium alginate, zein, and the like; semi-synthetic polymer material, such as methyl cellulose, ethyl cellulose, carboxymethyl cellulose, hydroxyethyl ethyl cellulose; full-synthetic polymer material, such as polyolefins, polystyrenes, polyethers, polyureas, polyethylene glycol, polyamide, polyurethane, polyacrylate, epoxy resins, among others. In certain embodiments, the method for wrapping a core material includes chemical methods such as interfacial polymerization, in situ polymerization, molecular encapsulation, radiation encapsulation; physicochemical methods such as aqueous phase separation, oil phase separation, capsule-heart exchange, pressing, piercing, powder bed method; and physical methods, such as spray drying, spray freezing, air suspension, vacuum evaporation deposition, complex coacervation, long and short centrifugation.

An example of a conventional preparation technique for the outer shell follows, and can be accomplished at stage 5(*e*). A gelatin is dissolved into n-hexane in a water bath at about 50° C. to obtain a 6% gelatin solution. The gelatin may optionally be swelled with deionized water before the preparation of the gelatin solution. The ball-in-ball $CaCO_3$ microparticles prepared in operation 506 are added to the gelatin solution while stirring to form an emulsified dispersion system. The pH is then adjusted to about 3.5-3.8 using acetic acid, and then a 20% sodium sulfate solution is slowly added into the dispersion system while maintaining a temperature of about 50° C. The temperature of the dispersion system is then lowered to a temperature of about 15° C. The result is a colloid of gelatin coated ball-in-ball $CaCO_3$ microparticles.

Operation 510 is a $CaCO_3$ extraction. In operation 510, the $CaCO_3$ core of the ball-in-ball $CaCO_3$ microparticles may be removed by complexation with ethylenediaminetetraacetic acid (EDTA) (0.2 M, pH 7.5) leading to formation of shell-in-shell microcapsules. For example, the gelatin coated ball-in-ball $CaCO_3$ microparticles produced in operation 508 may be dispersed in 10 mL of the EDTA solution (0.2 M, pH 7.5) and shaken for about 4 h, followed by centrifugation and re-dispersion in fresh EDTA solution. This core-removing process may be repeated several times to completely remove the $CaCO_3$ core. The size of the resulting shell-in-shell microcapsules ranges from about 8 μm to about 10 μm, and the inner core diameter ranges from about 3 μm to about 5 μm. One of the resulting shell-in-shell microcapsules is shown at stage 5(*f*). Depending on the application of use, the shell-in-shell microcapsule can have a range of about 0.5 μm to about 200 μm.

As noted above, the fabrication of polyelectrolyte capsules in the method 500 of FIG. 5 is based on the layer-by-layer (LbL) self-assembly of polyelectrolyte thin films. One skilled in the art will appreciate that a multi-compartment microcapsule for photon generation in accordance with some embodiments of the present disclosure may be produced by other conventional multi-compartment systems, such as polymeric micelles, hybrid polymer microspheres, and two-compartment vesicles.

As noted above, one skilled in the art will understand that various chemiluminescent reactants and oxidants can be used. Moreover, the multi-compartment microcapsule can utilize various chemiluminescent reactions. The chemistry used in chemiluminescent reactions is a mature technology, and those skilled in the art will know that additional materials can be further added to the multi-compartment microcapsule. For example, enhancing reagents such as alkyl dimethyl benzyl quaternary ammonium salt may be added to the reactants.

The photon-emitting reactants may be chosen to be inert with respect to the material of the microcapsule walls, or an isolating barrier within a microcapsule when the reactants are not in contact. The photon-emitting reactants also may be chosen to be inert with respect to the outer microcapsule wall when the reactants are in contact, or such that the chemical products of the reaction are inert with respect to the outer microcapsule wall, and any remnants of the inner microcapsule wall or barrier.

An amount of the first reactant and an amount of the second reactant may be determined. The amounts may be determined from the total amount of the reactants required to produce a desired amount of photons, the ratio of each reactant according to a reaction equation, the desired dimensions of the microcapsule, and the manner of isolating the reactants within the capsule. For example, a microcapsule may be desired having a maximum dimension less than or equal to a desired final thickness of less than 0.5 microns, and the amount of reactants may be chosen corresponding to the volume available within a microcapsule formed according to that dimension.

One or more inner microcapsules, such as illustrated by microcapsule 420 of FIG. 4A, may be formed and the inner microcapsules may contain second reactant(s). In various embodiments, an inner microcapsule may be formed to contain chemiluminescent reactants (including dye, oxalates, other reactants described herein, and combinations thereof). The inner microcapsule(s) may be formed with a capsule wall configured to rupture with application of a compressive force.

Further, an outer microcapsule may be formed containing the inner microcapsule(s) and one or more other reactants, in the manner of multi-compartment microcapsule 420 in FIG. 4A. The reactant(s) contained in the outer microcapsule may be inert with respect to each other and the microcapsule walls until in contact with one or more reactants contained in one or more inner microcapsules. In one embodiment, an outer microcapsule may contain hydrogen peroxide, or other oxidizers, where one or more inner microcapsules contain chemiluminescent reactants (including dye, oxalates, etc.). The capsule wall of the outer microcapsule may be formed to not rupture at the compressive force applied to rupture the capsule wall of the inner microcapsule.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A secured device comprising:
    an electronic component;
    a protective cover surrounding the electronic component;
    one or more chemiluminescent reactant layers disposed between the protective cover and the electronic component, the one or more chemiluminescent reactant layers including multiple reactants that undergo a chemiluminescent reaction; and
    a light sensor electrically connected to the electronic component, the light sensor configured to trigger one or more tamper response operations responsive to detection of a photon generated by the chemiluminescent reaction.

2. The secured device of claim 1, further comprising an optically transparent layer positioned between the one or more chemiluminescent reactant layers and the electronic component.

3. The secured device of claim 1, wherein the one or more chemiluminescent reactant layers include a first reactant layer and a second reactant layer, the first reactant layer separated from the second reactant layer by a fracturable layer.

4. The secured device of claim 3, wherein the first reactant layer includes a first reactant of the multiple reactants and the second reactant layer includes a second reactant of the multiple reactants, and wherein a compressive force associated with a physical access attempt results in fracture of the fracturable layer to enable the first reactant and the second reactant to mix and undergo the chemiluminescent reaction.

5. The secured device of claim 1, wherein the multiple reactants that undergo the chemiluminescent reaction are encapsulated within a light generating microcapsule.

6. The secured device of claim 5, wherein the light generating microcapsule includes a multiple-compartment microcapsule that comprises:
    a first compartment that contains a first reactant of the multiple reactants;
    a second compartment that contains a second reactant of the multiple reactants; and
    an isolating structure separating the first compartment from the second compartment, the isolating structure adapted to rupture in response to a compressive force associated with a physical access attempt to cause the first reactant and the second reactant to mix and undergo the chemiluminescent reaction.

7. The secured device of claim 6, wherein the multiple-compartment microcapsule includes a shell-in-shell microcapsule comprising an inner shell contained within an outer shell, wherein the inner shell encapsulates the first compartment, wherein the outer shell encapsulates the second compartment, and wherein the inner shell defines the isolating structure.

8. The secured device of claim 7, wherein the outer shell comprises a polymer, and the outer shell has a transmittance value of at least 90% for the wavelength within the particular emission range.

9. The secured device of claim 8, wherein the polymer comprises gelatin, arabic gum, shellac, lac, starch, dextrin, wax, rosin, sodium alginate, zein, methyl cellulose, ethyl cellulose, carboxymethyl cellulose, hydroxyethyl ethyl cellulose, polyolefins, polystyrenes, polyethers, polyesters, polyureas, polyethylene glycol, polyamides, polyimides, urea-formaldehydes, polyurethane, polyacrylate, epoxy resins, and combinations thereof.

10. The secured device of claim 1, wherein the chemiluminescent reaction includes excitation of a dye from a ground state to an excited state and subsequent release of the photon upon relaxation from the excited state to the ground state.

11. The secured device of claim 10, wherein excitation of the dye is caused by energy released during decomposition of a 1,2-dioxetanedione molecule.

12. The secured device of claim 11, wherein a chemical reaction of a diphenyl oxalate molecule with a hydrogen peroxide molecule results in formation of the 1,2-dioxetanedione molecule.

13. A process of utilizing chemiluminescence for tamper event detection, the process comprising:
    detecting, by a light sensor that is electrically connected to an electronic component of a secured device that includes a protective cover surrounding the electronic component, a photon generated by a chemiluminescent reaction within one or more chemiluminescent reactant layers disposed between the protective cover and the electronic component, wherein a compressive force associated with a physical access attempt results in the chemiluminescent reaction; and
    responsive to detecting the photon generated by the chemiluminescent reaction, triggering one or more tamper response operations.

14. The process of claim 13, wherein the one or more chemiluminescent reactant layers include a first reactant layer and a second reactant layer, the first reactant layer separated from the second reactant layer by a fracturable layer.

15. The process of claim 14, wherein the first reactant layer includes a first reactant and the second reactant layer includes a second reactant, and wherein a compressive force associated with a physical access attempt results in fracture of the fracturable layer to enable the first reactant and the second reactant to mix and undergo the chemiluminescent reaction.

16. The process of claim 13, wherein the one or more chemiluminescent reactant layers include shell-in-shell microcapsules having an inner shell contained within an outer shell, wherein the inner shell encapsulates a first reactant, wherein the outer shell encapsulates a second reactant.

17. The process of claim 16, wherein a compressive force associated with a physical access attempt results in rupture of the inner shell to enable the first reactant and the second reactant to mix and undergo the chemiluminescent reaction.

18. An electronic device comprising:
- a printed circuit board that includes a light sensor disposed on a surface of the printed circuit board;
- an optically transparent layer overlying the surface of the printed circuit board;
- one or more chemiluminescent reactant layers overlying the optically transparent layer, the one or more chemiluminescent reactant layers including multiple reactants that undergo a chemiluminescent reaction; and
- a protective cover surrounding the one or more chemiluminescent reactant layers, the optically transparent layer, and the printed circuit board,
- wherein the light sensor is configured to trigger one or more tamper response operations responsive to detection of a photon generated by the chemiluminescent reaction.

19. The electronic device of claim 18, wherein a compressive force associated with a physical access attempt causes a first reactant of the multiple reactants and a second reactant of the multiple reactants to mix within the one or more chemiluminescent reactant layers and undergo the chemiluminescent reaction.

20. The electronic device of claim 18, wherein the light sensor corresponds to a photovoltaic sensor to power a switch or battery to perform the one or more tamper response operations, and wherein the one or more tamper response operations correspond to one or more actions to prevent or limit access to one or more components of the electronic device.

* * * * *